UNITED STATES PATENT OFFICE.

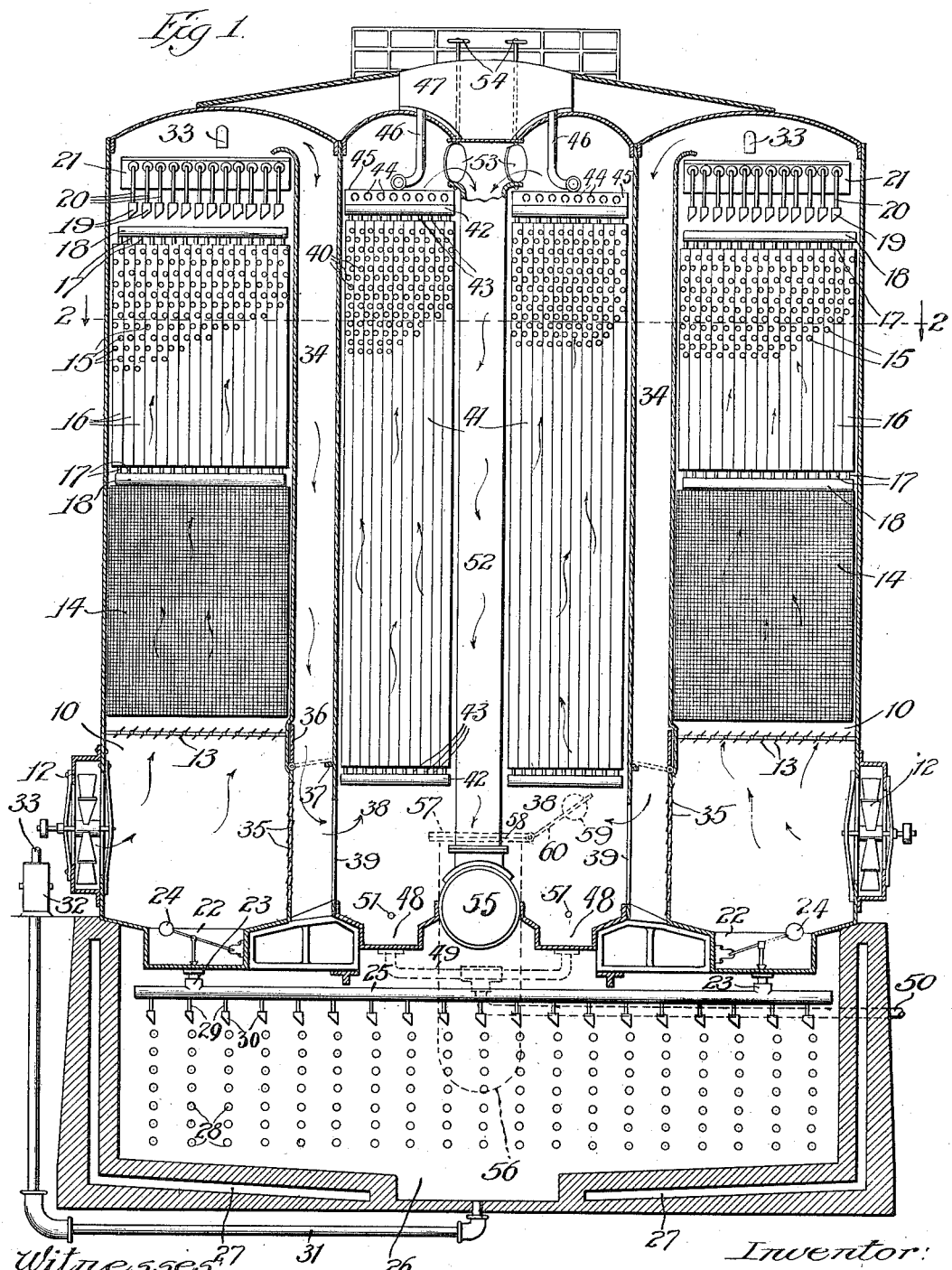

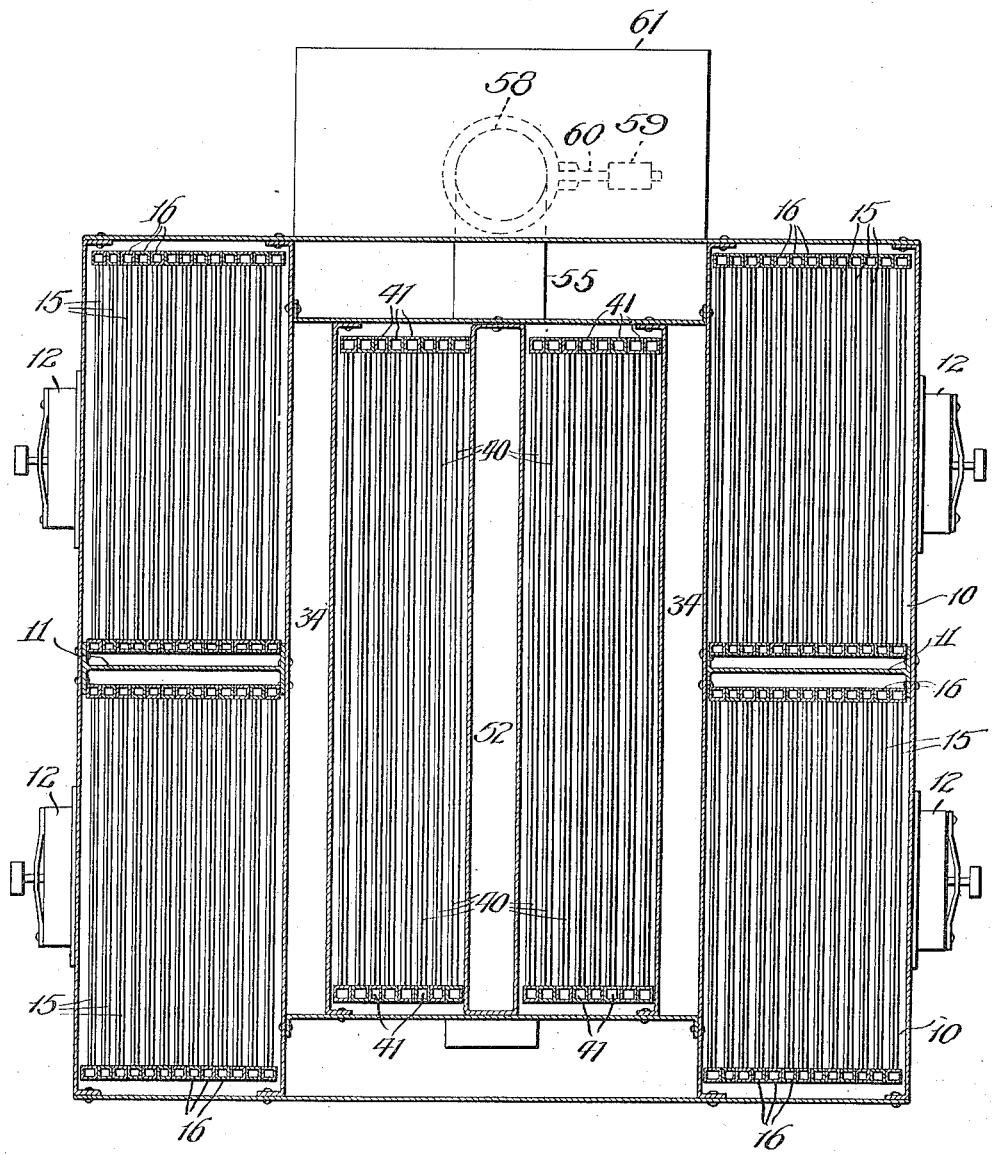

CHARLES H. LEINERT, OF CHICAGO, ILLINOIS.

METHOD OF REFRIGERATING AND DRYING GASES.

1,039,149.  Specification of Letters Patent.  Patented Sept. 24, 1912.

Application filed August 19, 1910. Serial No. 577,929.

*To all whom it may concern:*

Be it known that I, CHARLES H. LEINERT, a citizen of the United States, residing at Chicago, in the county of Cook and State of Illinois, have invented certain new and useful Improvements in Methods for Refrigerating and Drying Gases, of which the following is a specification.

My invention relates to methods for refrigerating and drying gases and is particularly adapted for use in drying the air used for the blast of blast furnaces.

In my copending application, Serial Number 557,225, filed April 23, 1910, I have described apparatus for accomplishing the refrigerating and drying of gases, but in my present application while much of the apparatus used in carrying out my improved method is much similar to that described in my copending application, above mentioned, I make use of an improved method which greatly increases the efficiency of my apparatus and reduces both its original cost of installation and cost of operation.

The fundamental improvement embodied in my present invention consists in the use of a method of cooling the gases by which the penetration of outside heat to the chambers and passages where the gases are brought to their lowest temperature, is effectually prevented. I accomplish this result by first introducing the air or other gases into preliminary cooling chambers which are located on opposite sides of the cooling tower. In passing through these chambers, which are independently supplied with air by rotary fans or other suitable means, the temperature of the air is reduced from that of the outside atmosphere to approximately 40° Fahrenheit. The air from each of the preliminary cooling chambers next passes through a passage located on the inner side of each cooling chamber and in this passage it is cooled approximately 2° Fahrenheit. The air next enters at the bottom of each of the final cooling chambers, and in passing through the same is cooled from approximately 38° to 18° Fahrenheit. The air finally passes downwardly through a central passage which is located between the two final cooling chambers and into which they both open. From this central passage the air passes to the intake of the blowing engines. From this general description of my improved method, it will be clear that the air in its final cooled condition passes between the two final cooling chambers which have the lowest temperature of any of the chambers or passages in the apparatus, and increase in the temperature of the air is thus effectually prevented. Similarly the final cooling chambers are themselves protected on their outer sides from the access of the heat of the outside atmosphere by means of the two preliminary cooling chambers. In this way it is possible to maintain a lower temperature more economically in the final cooling chambers.

During the winter time the atmospheric air is, of course, at a much lower temperature than during the summer, and for this reason I have employed, in the apparatus for carrying out my improved method, means for introducing air at a suitable point in the cooling tower. Thus when the outside temperature is in excess of 40° Fahrenheit, I pass the air through both the preliminary and final cooling chambers of the cooling tower. If the temperature is between 20° and 40°, however, I pass the air only through the final cooling chambers, and if the temperature is below 20° Fahrenheit, I cut out the cooling tower entirely and introduce the air directly to the intake of the blowing engines.

In conducting air to a blowing engine considerable difficulty is often encountered by reason of pulsations which are given to the air by the action of the blowing engines. In my improved method of cooling the air, however, the preliminary chamber is constructed of considerably larger size than the final cooling chamber, and for this reason there is a constant supply of air available, the pressure maintained in the preliminary cooling chamber being in the vicinity of three ounces above atmospheric pressure. If the air is introduced directly into the final cooling chamber, as when the outside temperature is between 20° and 40° Fahrenheit, I have provided means by which the communication between the passage leading from the preliminary cooling chamber to the final cooling chamber is interrupted, thereby causing the preliminary chamber to act as a wind chamber in a manner similar to the wind chamber of an ordinary water pump, and thus decrease the effect of the pulsations caused by the blowing engines.

Another advantage of my invention consists in the method which I use for forcing the air to the refrigerating apparatus. The air first passes upwardly through the preliminary cooling chamber, then downwardly through a passage into the final cooling chamber and then upwardly through the final cooling chamber. By this method of forcing the air through the apparatus an efficient distribution of the air is obtained through the cooling medium. As the air passes upwardly through the two chambers containing the cooling medium, this air gradually grows heavier and thereby serves to cause the air to spread laterally, giving a good distribution throughout the entire chamber and thereby avoiding channeling.

These and other advantages of my invention will be more apparent by reference to the accompanying drawings which represent a preferred form of apparatus by which my method may be carried out and in which:

Figure 1 is a vertical section through the cooling tower, and Fig. 2 is a horizontal section on the line 2—2 of Fig. 1.

I will first describe the apparatus by which my method is carried out, after which the method itself will be readily understood.

Located at the sides of the cooling tower are the preliminary cooling chambers 10, 10 which are preferably transversely divided by means of the partitions 11, 11 in order to more advantageously accommodate the large volume of air passing therethrough. The air is supplied to the preliminary cooling chambers by means of the rotary fans 12 which are driven by any suitable source of power as will be readily understood. Extending horizontally across each of the preliminary cooling chambers 10 in a plane just above the rotary fans 12, is the series of louvers 13 which may be operated by any suitable mechanism passing to the outside of the main casing of the cooling tower. Above the louvers 13 is a series of screens or chain-plates 14, the function of which is to distribute cold water descending from above so that a large surface of water will be exposed to the action of the air which passes upwardly through the chamber as will be described hereafter. These chain-plates or screens are suitably supported by means of rods passing across each of the chambers 10. Located above the screens 14 is a series of pipes 15 which extend in a horizontal plane in a longitudinal direction. These pipes are for the purpose of distributing water in order to cause it to present a large surface area in much the same way that this result is attained by the screens or chain plates 14. These pipes may be replaced by rods or bars, but I prefer to use pipes as shown which are connected on their ends with the vertical headers 16, which, in turn communicate through small pipes 17 with the horizontal headers 18. The headers 18 and 16 may be supplied with liquid ammonia in the well known manner, and in this way the pipes 15 may be cooled and thus exercise a further positive cooling action on the descending water. In most cases, however, I rely on the cooling means which will presently be described, and this positive cooling of the water as it passes over the pipes 15 is unnecessary.

Directly above the pipes 15 is located the series of troughs 19 which are supplied with water through the pipes 20 leading from the tanks 21. As the troughs 19 are filled with water, the same overflows and passes downwardly over the pipes 15 and thence on to the screens 14 and finally accumulates in the troughs 22 located in the bottoms of the chambers 10. Each of the troughs 22 is provided with an outlet 23 which has therein a valve which is controlled by suitable float mechanism 24 so that when the water reaches a predetermined height in the trough 22, the valve in the outlet 23 is opened and the water passes into the pipe 25. This pipe 25 is located in the upper part of the cooling reservoir 26 which is located below the cooling tower. This reservoir is preferably constructed of cement and is provided with heat insulating air spaces 27. The ammonia pipes 28 extend through this cooling reservoir, and are supplied with liquid ammonia in any of the well known ways. The pipe 25 is provided with a plurality of small outlet pipes 29 which conduct water to the troughs 30. As the water overflows from these troughs, it trickles down over the pipes 28 and is cooled, thereby accumulating in the bottom of the cooling reservoir 26.

Leading from the bottom of the cooling reservoir 26 is the pipe 31 which is connected with the pump 32. The pipe 33 leads to the upper portion of each of the chambers 10 and serves to supply water to the tanks 21. Leading downwardly just inside of each of the chambers 10, is the passage 34. In the lower portion of the wall separating the chambers 10 from the passages 34, are located the louvers 35, the purpose of which will be explained hereafter. Just above these louvers is the damper 36 which is controlled from the outside of the cooling tower and which when turned into its horizontal position against the stop 37 interrupts communication between the upper and lower portions of each of the passages 34.

Located inside of each passage 34 and toward the central portion of the cooling tower, are the two final cooling chambers 38 which connect with the passages 34 through the openings 39. Each of the final cooling chambers 38 is supplied with a plurality of horizontally and longitudinally extending pipes 40 which are located between the headers 41, these headers being supplied with ammonia through the horizontal headers 42, the pipes 43 serving to connect the headers 41 with the headers 42. Just above the upper headers 42 are the pipes 44 which are longitudinally split on their upper portions and are connected with the header 45. Each of the headers 45 is, in turn, connected with a pipe 46 which leads from the calcium chlorid reservoir 47. The calcium chlorid supplied from this reservoir passes out of the slits in the pipes 44 and then passes downwardly over the ammonia cooled pipes 40. This thin film of calcium chlorid prevents the formation of ice on the surface of the pipes 40. The calcium chlorid passing downwardly over the pipes 40 accumulates in the troughs 48 in the bottom of each chamber 38. The outlet pipe 49 connects with the bottom of each trough 48 and is in turn, connected with the pipe 50. Pipe 50 leads to a pump which serves to elevate the calcium chlorid accumulating in the troughs 48 to the reservoir 47. An overflow 51 is provided in each of the troughs 48, this overflow serving to lead the calcium chlorid to a concentrator when the solution becomes too dilute.

The upper portion of each of the final cooling chambers 38 connects with the central passage 52, a damper or valve 53 controlled by the hand wheel 54 being located in the aperture between each of the final cooling chambers and the central passage 52. The purpose of these dampers 53 is to regulate the flow of air through the cooling tower and particularly its admission to the blowing engines. The passage 52 communicates with the pipe 55, which, after passing horizontally to the exterior of the cooling tower, passes downwardly and communicates with the intake 56 of the blowing engine. At the point where the pipe or tube 55 changes from a horizontal to a vertical direction, an upstanding portion of tube 57 is provided which is covered by the weight controlled hinged valve or cap 58. This valve, in its normal closed position, prevents the access of air directly from the exterior to the intake of the blowing engines, but when the weight 59 is moved to the end of the arm 60, the valve 58 is raised and air flows directly from the exterior to the intake pipe 56. A suitable housing 61 is built around this valve in order to prevent admission of rain, snow, dust, and the like.

Having thus described the construction of the apparatus used in my improved method, the method itself may now be readily understood. The air to be cooled is first forced into the preliminary cooling chambers 10 by the rotary fans 12. As previously explained, cooled water passes downwardly through the preliminary cooling chambers 10 through the louvers 13, which are normally open. The air in passing upwardly through the chambers 10 is cooled by the action of the water, and mechanical impurities are also removed, so that at the upper ends of these chambers the temperature has been reduced to approximately 40° Fahrenheit. The pressure in the preliminary cooling chambers remains approximately three ounces above atmospheric pressure. The air next passes downwardly through the passages 34. The louvers 35 are normally closed so that the air then passes into the lower portions of the final cooling chambers 38. When the air reaches the lower ends of the passages 34, its temperature has been reduced from 40° to approximately 38°. As previously explained, the pipes 40 are cooled by the evaporation of liquid ammonia and moisture is prevented from congealing on the surface of the same by means of the film of calcium chlorid. The air in passing upwardly through these final cooling chambers is still further cooled by the pipes 40 so that when it reaches the tops of these chambers the temperature is approximately 18° Fahrenheit. The air from both of the final cooling chambers 38 then passes through the apertures controlled by the dampers 53 into the central passage 52. From this passage the air passes into the tube 55 and into the intake 56 leading to the blowing engines. In case the temperature of the outside air is between 20° and 40° Fahrenheit, the preliminary chambers 10 are not used for cooling purposes. In this case the dampers 36 are turned into their horizontal positions, thus interrupting communication between the passages 34 and the final cooling chambers 38. The louvers 35 are opened, and the air is thereby caused to pass directly from the rotary fans 12, between the louvers 35 and from the openings 39, into the lower portions of the final cooling chambers 38. In carrying out this operation, the louvers 13 may be closed if desired, but I prefer to leave them open so that the preliminary cooling chambers act as wind chambers, thereby reducing pulsations caused by the blowing engines. As previously explained, when the temperature of the outside air is below 20° Fahrenheit, the cooling tower is entirely cut out from operation and air is admitted directly to the intake 56 by opening the valve 58.

It will be apparent to those skilled in the art that many changes might be made in the exact details of the method which I have described without departing from the spirit of my invention. For example, the passages connecting the cooling chambers may be disposed in various manners, and a great variety of cooling devices may be used within the cooling chambers themselves, thus changing to some degree the operation of my method. Broadly considered, however, my method consists in refrigerating air or other gases by first subjecting the same to the action of a preliminary cooling medium and then to the action of a second cooling medium from which the radiation of cold is prevented by having the same inclosed or bounded on its sides by the preliminary cooling medium, in this way rendering the cooling of the air or other gases much more efficient and economical.

What I claim is:

1. The herein described method of treating gases which consists in maintaining two independent currents of gas traveling inwardly in opposite directions toward one another, each current of gas being divided into a plurality of upwardly traveling currents and at least one downwardly traveling current of gas located between and out of contact with the upwardly traveling currents of gas and leading from the upper portion of one upwardly traveling current of gas to the lower portion of the next succeeding upwardly traveling current of gas, mingling the two currents of gas into a single current of gas, and subjecting the upwardly traveling currents of gas to a refrigerating medium.

2. The herein described method of treating gases which consists in maintaining two independent currents of gas traveling inwardly in opposite directions toward one another, each current of gas being divided into a plurality of upwardly traveling currents and at least one downwardly-traveling current of gas located between and out of contact with the upwardly traveling currents of gas and leading from the upper portion of one upwardly traveling current of gas to the lower portion of the next succeeding upwardly traveling current of gas, mingling the two currents of gas into a single downwardly traveling current of gas located between and out of contact with the innermost upwardly traveling portions of the two currents, and subjecting the upwardly traveling currents of gas to a refrigerating medium.

3. The herein described method of treating gases which consists in maintaining two independent currents of gas traveling inwardly in opposite directions toward one another, each current of gas being divided into a plurality of upwardly traveling currents and at least one downwardly traveling current of gas located between and out of contact with the upwardly traveling currents of gas and leading from the upper portion of one upwardly traveling current of gas to the lower portion of the next succeeding upwardly traveling current of gas, mingling the two currents of gas into a single downwardly traveling current of gas located between and out of contact with the innermost upwardly traveling portions of the two currents, and permitting a cooling liquid to gravitate through the upwardly traveling currents of gas, substantially as and for the purpose described.

CHAS. H. LEINERT.

Witnesses:
  WM. O. BELT,
  M. A. KIDDIE.